(12) United States Patent  (10) Patent No.: US 8,750,597 B2
Patterson et al.  (45) Date of Patent: Jun. 10, 2014

(54) ROBUST INSPECTION ALIGNMENT OF SEMICONDUCTOR INSPECTION TOOLS USING DESIGN INFORMATION

(75) Inventors: Oliver D. Patterson, Poughkeepsie, NY (US); Kevin T. Wu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 13/303,440

(22) Filed: Nov. 23, 2011

(65) Prior Publication Data

US 2013/0129189 A1    May 23, 2013

(51) Int. Cl.
    *G06K 9/00*    (2006.01)

(52) U.S. Cl.
    USPC .......................................................... 382/151

(58) Field of Classification Search
    USPC ................................................. 382/141–151
    See application file for complete search history.

(56) References Cited

U.S. PATENT DOCUMENTS

| | | | |
|---|---|---|---|
| 7,295,695 B1 | 11/2007 | Dayal | |
| 7,397,556 B2 | 7/2008 | Patterson et al. | |
| 7,456,636 B2 | 11/2008 | Patterson et al. | |
| 7,474,107 B2 | 1/2009 | Patterson et al. | |
| 7,518,190 B2 | 4/2009 | Cote et al. | |
| 7,570,796 B2 | 8/2009 | Zafar et al. | |
| 7,676,077 B2 | 3/2010 | Kulkarni et al. | |
| 7,679,083 B2 | 3/2010 | Sun et al. | |
| 7,732,866 B2 | 6/2010 | Cote et al. | |
| 7,733,109 B2 | 6/2010 | Ahsan et al. | |
| 7,772,866 B2 | 8/2010 | Patterson et al. | |
| 7,796,804 B2 | 9/2010 | Bhaskar et al. | |
| 8,227,752 B1* | 7/2012 | Mantz et al. | 250/306 |
| 8,395,766 B2* | 3/2013 | Imai et al. | 356/237.3 |
| 2007/0156379 A1 | 7/2007 | Kulkarni et al. | |
| 2007/0221990 A1 | 9/2007 | Cote et al. | |
| 2007/0222470 A1 | 9/2007 | Patterson et al. | |
| 2007/0229092 A1 | 10/2007 | Patterson et al. | |
| 2007/0230770 A1 | 10/2007 | Kulkarni et al. | |
| 2008/0058977 A1* | 3/2008 | Honda | 700/110 |
| 2008/0100831 A1 | 5/2008 | Patterson et al. | |
| 2008/0217612 A1 | 9/2008 | Patterson et al. | |
| 2008/0225284 A1 | 9/2008 | Patterson et al. | |
| 2008/0312552 A1* | 12/2008 | Zhou et al. | 600/558 |
| 2009/0096461 A1 | 4/2009 | Ahsan et al. | |
| 2011/0149275 A1 | 6/2011 | Nakano et al. | |
| 2011/0170091 A1 | 7/2011 | Chang et al. | |

OTHER PUBLICATIONS

S. Jansen et al., "Utilizing Design Layout Information to Improve Efficiency of SEM Defect Review Sampling," ASMC; 2008.

J.H. Yeh and A. Park, "Novel Technique to Identify Systematic and Random Defects During 65nm and 45nm Process Development for Faster Yield Learning," ASMC 2007.

* cited by examiner

*Primary Examiner* — Daniel Mariam
(74) *Attorney, Agent, or Firm* — Cantor Colburn LLP; Ian MacKinnon (57) ABSTRACT

A method of performing inspection alignment point selection for semiconductor devices includes importing, with a computer device, one or more semiconductor design files corresponding to an area of a semiconductor die; aligning a design taken from the one or more semiconductor design files with an image taken from a die of a semiconductor wafer; and selecting an alignment point and recording a portion of the design file corresponding to the alignment point as a master reference image.

16 Claims, 6 Drawing Sheets

Figure 1

Ti wafer

Al wafer

ROBUST INSPECTION ALIGNMENT OF SEMICONDUCTOR INSPECTION TOOLS USING DESIGN INFORMATION

BACKGROUND

The present invention relates generally to semiconductor device manufacturing and, more particularly, to robust inspection alignment of semiconductor inspection tools using design information.

Fabricating semiconductor devices, such as logic and memory devices, typically includes processing a semiconductor wafer (substrate) using a large number of fabrication processes to form various features and multiple levels of the semiconductor devices. For example, lithography is a semiconductor fabrication process that involves transferring a pattern from a reticle to a photoresist layer formed on a semiconductor wafer. Additional examples of semiconductor fabrication processes include, but are not limited to, chemical-mechanical polishing (CMP), etching, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers in order to produce higher yield. While inspection has always been an integral part of fabricating semiconductor devices, the continued miniaturization of such devices has placed increased importance on inspection for the successful manufacture of acceptable semiconductor devices, as smaller defects can cause device failure. For instance, as the dimensions of semiconductor devices decrease, detection of defects of decreasing size has become necessary since even relatively small defects may cause unwanted aberrations in the semiconductor devices.

However, as the progressive shrinking of integrated circuits to submicron-sized features has continued, identifying and eliminating defects formed during wafer processing has (in addition to becoming increasingly more important) also become more difficult. Previously used optical inspection techniques are ineffective for a growing percentage of these defects. As such, fast response, high magnification inspection techniques are required to support rapid defect learning and to ensure device reliability, particularly during the product development phase. In this regard, automated e-beam inspection (EBI) wafer imaging tools with high resolution and large depth-of-focus have been developed in response to the need for rapid feedback on process or reticle defects which cannot be observed by conventional optical inspection. In general, e-beam imaging tools operate by rastering an e-beam across a wafer and comparing a signal from a given position on chips to the same position on two adjacent chips.

EBI is able to capture extremely small physical defects, as well as defects that can only be detected through voltage contrast from their electrical characteristics. Also, high quality patch images, which are very useful for classification of the defects, are captured for almost all defects. These advantages with respect to conventional optical imaging make EBI a preferred inspection technique for a wide range of applications in the semiconductor manufacturing industry.

SUMMARY

In an exemplary embodiment, a method of performing inspection alignment point selection for semiconductor devices includes importing, with a computer device, one or more semiconductor design files corresponding to an area of a semiconductor die; aligning a design taken from the one or more semiconductor design files with an image taken from a die of a semiconductor wafer; and selecting an alignment point and recording a portion of the design file corresponding to the alignment point as a master reference image.

In another embodiment, a method of performing inspection alignment of semiconductor devices includes aligning, with an inspection tool, an image of a wafer under inspection with a master reference image, in a region of an alignment point, wherein the master reference image is predetermined by importing one or more semiconductor design files corresponding to an area of a semiconductor die, aligning a design taken from the one or more semiconductor design files with an image taken from a die of a previously scanned wafer, and selecting an alignment point and recording a portion of the design file corresponding to the alignment point as a master reference image; and finding a best match between the master reference image and the image of the wafer under inspection so as to identify the alignment point on the wafer under inspection.

In another embodiment, a non-transitory, computer readable medium having instructions stored thereon that, when executed by a computer, implement a method of performing inspection alignment of semiconductor devices. The method includes aligning an image of a wafer under inspection in a region of an alignment point with a master reference image, wherein the master reference image is predetermined by importing one or more semiconductor design files corresponding to an area of a semiconductor die, aligning a design taken from the one or more semiconductor design files with an image taken from a die of a previously scanned wafer, and selecting an alignment point and recording a portion of the design file corresponding to the alignment point as a master reference image; and finding a best match between the master reference image and the image of the wafer under inspection so as to identify the alignment point on the wafer under inspection.

In another embodiment, a system for performing inspection alignment of semiconductor devices includes a computer device in communication with an inspection tool. The inspection tool is configured to align an image of a wafer under inspection in a region of an alignment point with a master reference image, wherein the master reference image is predetermined by importing one or more semiconductor design files corresponding to an area of a semiconductor die, aligning a design taken from the one or more semiconductor design files with an image taken from a die of a previously scanned wafer, and selecting an alignment point and recording a portion of the design file corresponding to the alignment point as a master reference image. The computer device is configured to find a best match between the master reference image and the image of the wafer under inspection so as to identify the alignment point on the wafer under inspection.

BRIEF DESCRIPTION OF THE SEVERAL VIEWS OF THE DRAWINGS

Referring to the exemplary drawings wherein like elements are numbered alike in the several Figures.

DETAILED DESCRIPTION

As indicated above, advantages of EBI include sensitivity to extremely small physical defects and voltage defects, as well as high quality patch images that in turn enable good quality classifications. On the other hand, current EBI techniques are not without their own disadvantages such as, for example, low throughput and sensitivity to alignment inaccuracy, particularly during die to die comparison (i.e., random mode inspection). The preciseness of wafer alignment plays a critical part in random mode inspection because the pixel size of EBI is very small (currently as low as 3 nanometers versus an optical inspection minimum pixel size of 50 nanometers), and thus there is not much room for error.

In addition, and in contrast to optical inspection, EBI wafer alignment uses electron beam (e-beam) images for its final two alignments, "high magnification" and "low magnification." The selected alignment points need to have good contrast in their pattern. While optical alignment points are susceptible to die to die variability, e-beam is affected to a much greater extent in this regard, for a number of reasons including charging and a lack of subsurface features.

Figure 1:
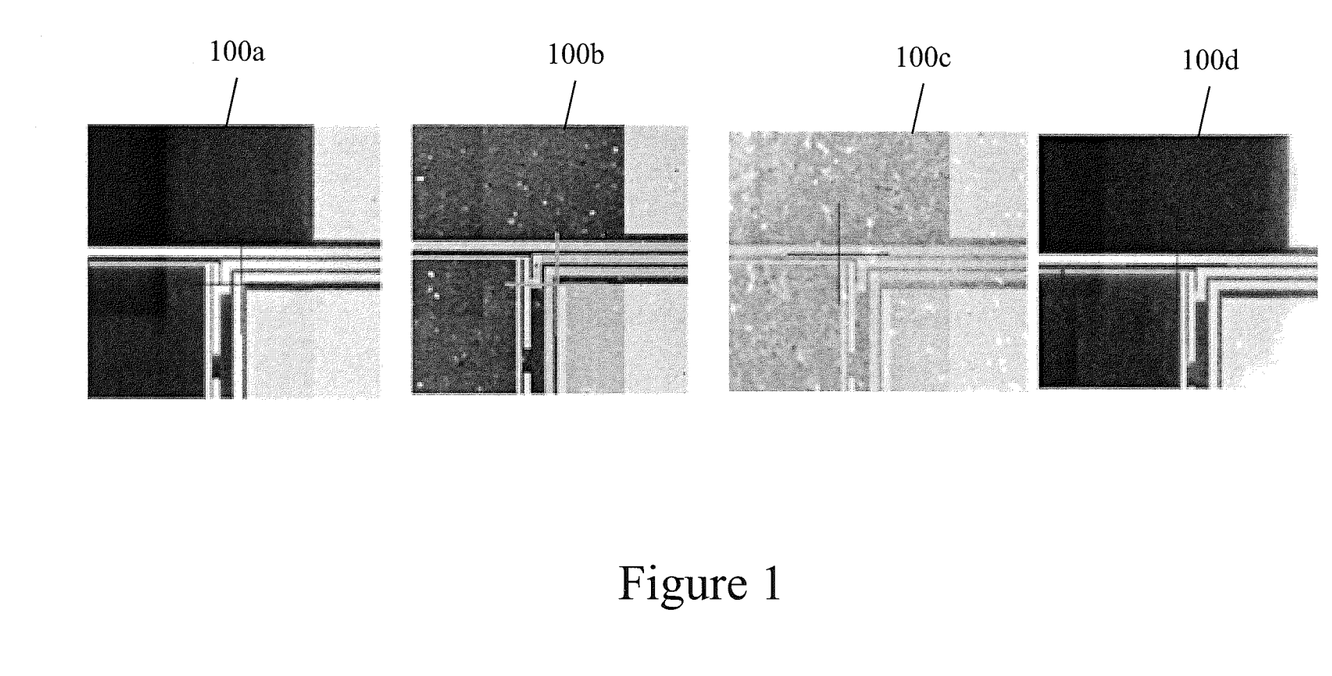
FIG. 1 illustrates a sequence of e-beam images taken of different die formed on a same wafer.

With respect to the first, a wafer will charge and as a result may greatly change the appearance of the alignment point from die to die across the wafer. FIG. 1 illustrates an example of this, in which image 100a is an e-beam image of the first alignment site as compared to an image 100b of a selected known good die (KGD). Images 100c and 100d are e-beam images of other die formed on a same wafer as the die of image 100a. Thus, it will be seen that even with careful selection of the alignment point and beam conditions, there is still a significant contrast and graininess difference between alignment sites across the wafer. That is, because of die to die variability, charging will differ across the wafer. In addition, burn marks may also be created while trying to center the site for the master image.

Figure 2:
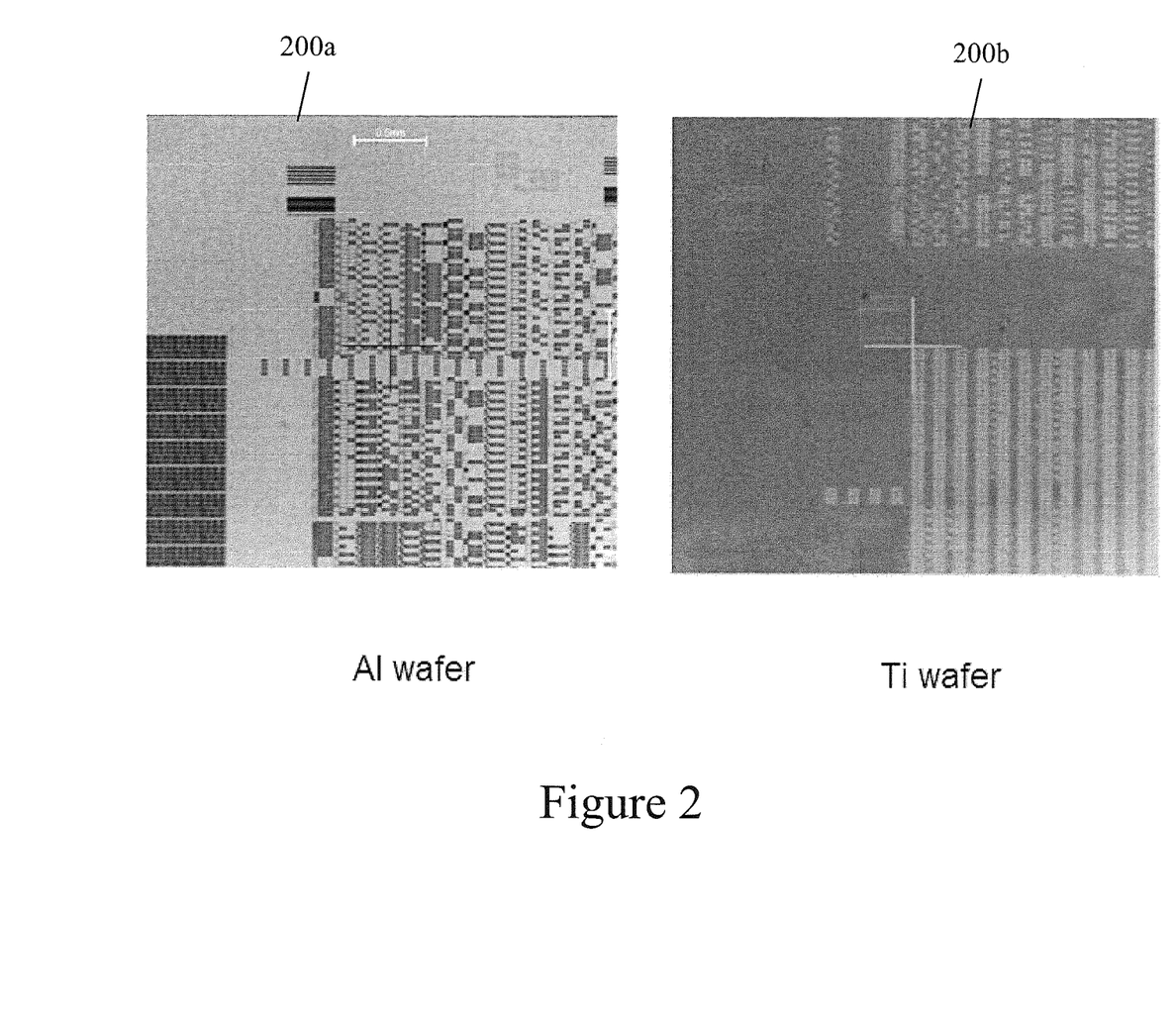
FIG. 2 illustrates a pair of optical images of wafers having different blanket films formed thereon.

With respect to the second disadvantage mentioned above, an e-beam detector only sees the immediate surface of the wafer. As result, optical alignment (which is utilized for both optical and e-beam inspection tools) is influenced by a change in the subsurface layer as shown in FIG. 2. In particular, FIG. 2 depicts a first optical image 200a of a wafer having an aluminum (Al) blanket film formed over the wafer, and a second optical image 200b of a wafer having a titanium (Ti) blanket film formed over the wafer. The images, while at the same site with respect to each wafer, depict the difficulty with optical alignment to a same feature when the wafer is covered with different materials. As a result, new recipes are created to handle different material stacks. During development, when investigating different materials is part of process development, this becomes a major inconvenience.

Accordingly, disclosed herein is a method of implementing robust alignment point selection and inspection alignment of semiconductor inspection tools using design information. With previous e-beam inspection methods, the approach was to attempt to select the most robust alignment points and filtering algorithms. However, this approach still results in numerous alignment failures, as well as requiring manual intervention and tuning of the alignment parameters in an inspection recipe. As explained in further detail below, the present embodiments use a design image, rather than a wafer image, as the master e-beam (and optical) alignment image in an inspection recipe.

Figure 3:
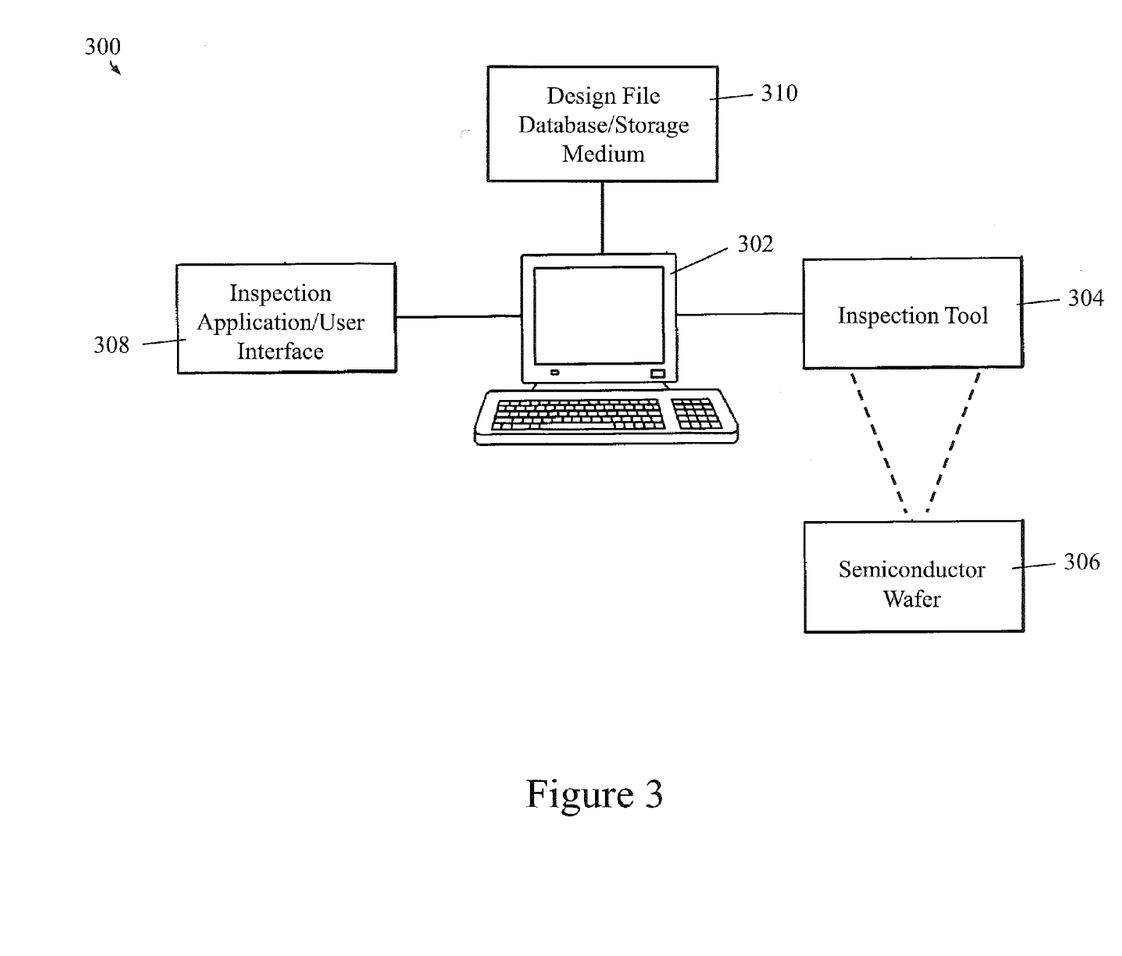
FIG. 3 is block diagram of an exemplary inspection system 300 suitable for detecting defects on a semiconductor wafer.

Referring now to FIG. 3, there is shown a block diagram of an exemplary inspection system 300 suitable for detecting defects on a semiconductor wafer. The inspection system 300 may be part of a manufacturing facility that produces semiconductor products. As is shown, the system 300 includes a computer device 302 in communication with an inspection tool 304 via any suitable communications technologies (e.g., wire line/wireless, direct communications or via local area network, etc.). The inspection tool 304 is configured to detect defects on a semiconductor wafer 306, and may encompass any appropriate inspection system known in the art, such as, but not limited to, a bright-field inspection system, a dark-field inspection system, or an e-beam inspection system. Upon receiving the instructions from the computer device 302, the inspection tool 304 may perform an inspection process at locations of the semiconductor wafer 306 identified in instructions provided by the computer device 302.

The computer device 302 may include, but is not limited to, a personal computer system, mainframe computer system, workstation, image computer, parallel processor, or any other device known in the art, and may be operated by an individual that is tasked with monitoring and optimizing the sensitivity of the inspection tool 304. In general, the term "computer device" or "computer system" may be broadly defined to encompass any device having one or more processors, which execute instructions from a memory medium.

Further, the computer device 302 is configured to execute an inspection application 308 including a user interface for implementing the inspection activities described hereinafter. Again, program instructions implementing the inspection application may be transmitted over or stored on any suitable carrier medium such as a wire, cable, or wireless transmission link. The carrier medium may also include a storage medium such as a read-only memory, a random access memory, a magnetic or optical disk, or a magnetic tape. As is further depicted in FIG. 3, a storage medium 310 in communication with the computer device 302 includes a design file database that is accessed during inspection recipe setup.

Figure 4A:
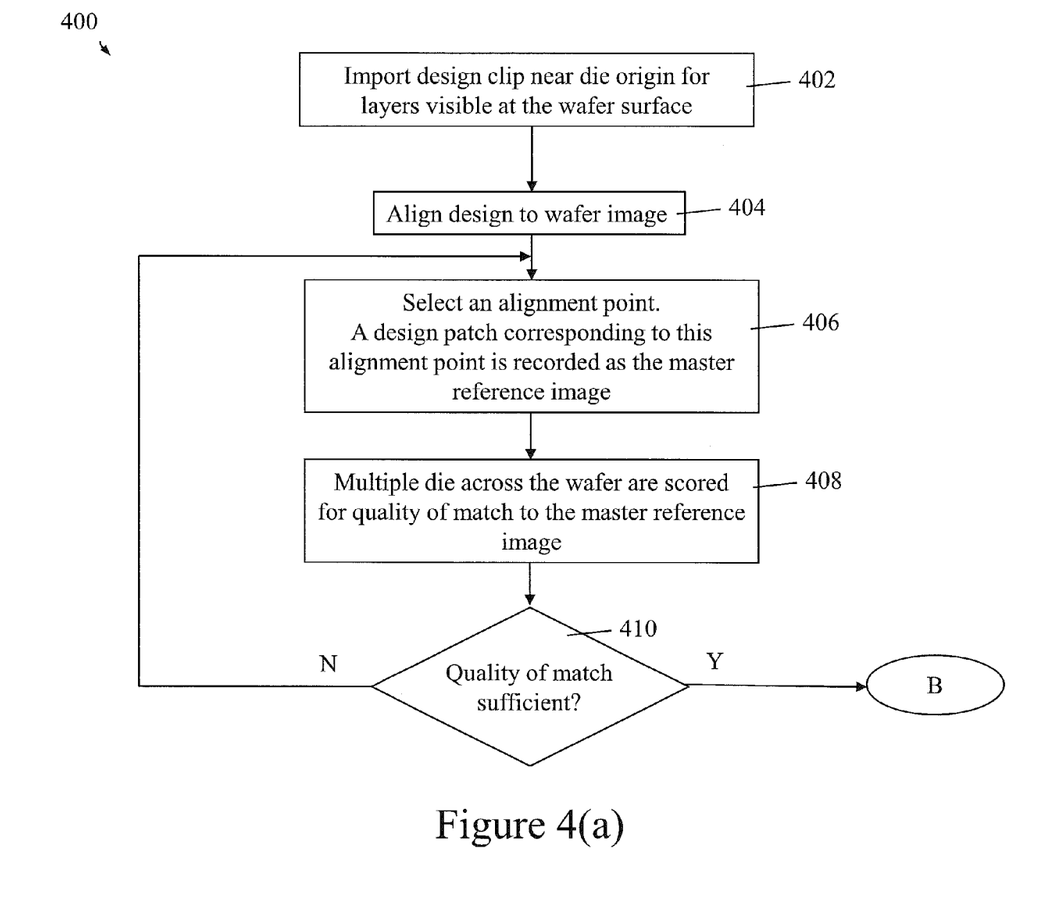
FIG. 4(a) is a flow diagram of a method of implementing inspection alignment point selection for semiconductor devices, in accordance with an exemplary embodiment.

Referring now to FIG. 4, there is shown a flow diagram of a method of implementing inspection alignment point selection of semiconductor devices, in accordance with an exemplary embodiment. In block 402, the method 400 begins during recipe set up by importing, from the design database, one or more design files that are directed toward a small area, for example, near the die origin for the level or levels visible at the wafer surface. (Previously, recipe set up would have involved selecting a master reference image from an actual die.) Then, as shown in block 404, the imported design image is aligned with the corresponding wafer image. In this regard, one or more points on the wafer corresponding to the origin and/or other points on the design clip may be selected.

In block 404, the method 400 continues by selecting an alignment point using either the wafer image or the corresponding imported design, in accordance with best known method (BKM) e-beam conditions. This selection may be performed, for example, by an engineer performing a set up process. A design patch (i.e., a portion of the wafer image) corresponding to this selected alignment point is recorded as the master reference. Once the master reference is selected in this manner, multiple die across the wafer are rastered and scored for the quality of the match of the detected image with the master reference. In the event that the determined scores do not meet some predetermined threshold for match quality as reflected in decision block 410, then the process may return to block 406 for selection of a different alignment point so that a new design patch corresponding to the updated alignment point may be recorded as the new master reference. Otherwise, once the quality of the match is deemed sufficient (e.g., by the individual performing the set up process), wafer alignment point selection is complete, and the inspection may proceed in accordance with a desired process flow.

Figure 4B:
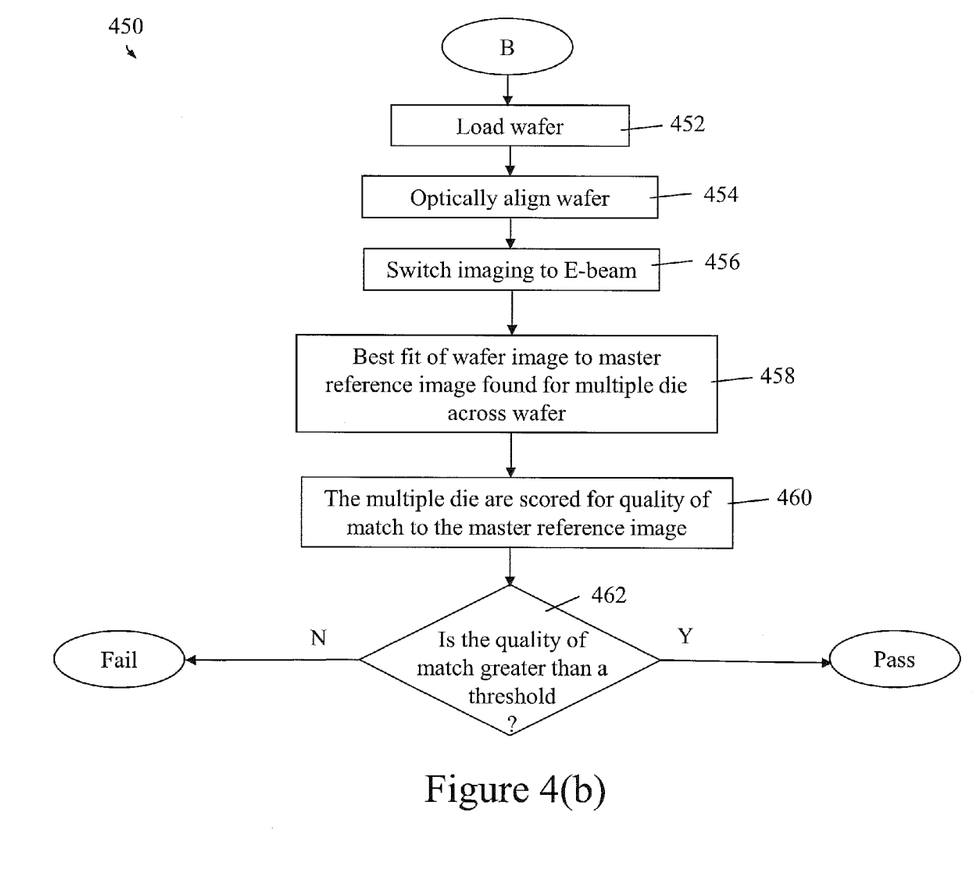
FIG. 4(b) is a flow diagram of a method of implementing inspection alignment of semiconductor devices using the alignment point selection of FIG. 4(a)

In the embodiments illustrated, following completion of the wafer alignment point selection, reference is made to FIG. 4(*b*), which illustrates a flow diagram of a method of implementing inspection alignment of semiconductor devices using the alignment point selection of FIG. 4(*a*). As is shown, a wafer is loaded at block 452 and optically aligned at block 454. Then, using an e-beam imaging tool as reflected in block 456, the tool determines a best fit of the wafer image to the master reference image selected by the process of FIG. 4(*a*), for multiple die across the wafer as illustrated in block 458. Then, as shown in block 460, the multiple die are scored for quality of the match to the master reference image. If it is determined at decision block 462 that the quality of the match is greater than a predetermined threshold value, then the wafer passes alignment. Otherwise, the wafer fails alignment.

Among the advantages of the above described techniques is the removal of the influence of burn marks in the master image and charging at the alignment sites for any wafer being aligned. In addition, the above technique also removes the influence of contamination. Although an edge algorithm may be applied to a master image selected from an existing die, the design clip offers a more perfect version of this alignment site. By using it, about half of the signal noise is removed, owing to the fact that no image is taken for the master. While design information in general may have been used for certain aspects of semiconductor wafer inspection (e.g., using design information to help bin defects), it has not been used for alignment purposes as described above.

Figure 5:
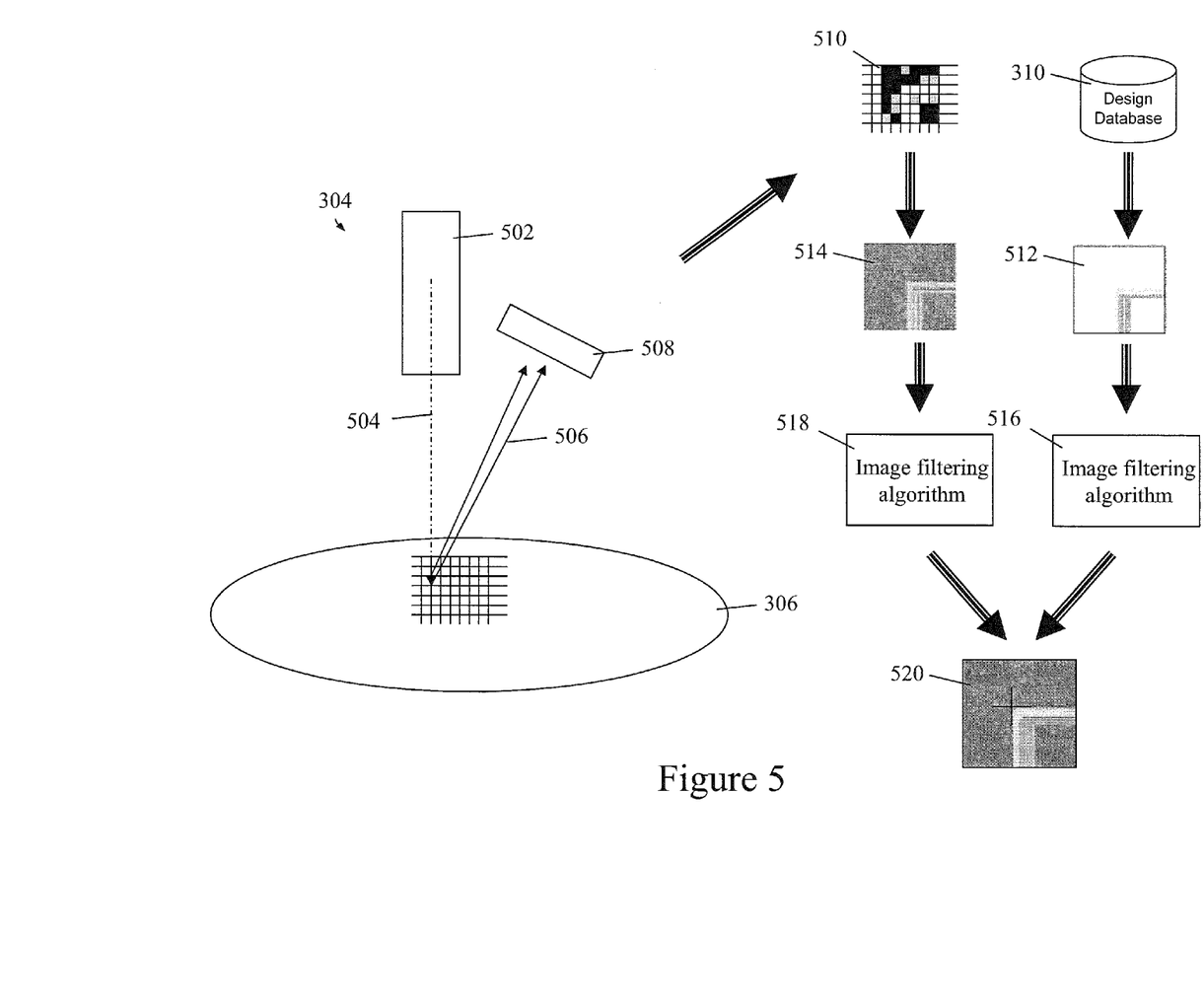
FIG. 5 is a schematic diagram illustrating the use of a design clip for alignment purposes.

Finally, FIG. 5 is a schematic diagram illustrating the use of a design clip for alignment purposes. The inspection tool 304, which in this example is part of an e-beam inspection system, employs an electron gun 502 that emits an electron beam 504 incident upon the surface of the semiconductor wafer 306. Secondary and backscattered electrons 506 are detected by a collector 508, which results in the generation of a pixelated image 510 in the computer device (e.g., computer device 302 in FIG. 3). As described above, design files directed toward a small area near the die origin are imported from the design database 310. The selected master image 512 and the corresponding wafer image 514 are filtered using a filtering algorithm 516, 518, such as edge detection or smoothing, for example, and then overlapped with one another for alignment purposes, as depicted by the resulting overlap image 520. In order for the inspection tool to determine an exact location of the die origin for each die on the wafer, multiple alignment points may be identified and used to align the wafer.

In view of the above, the present embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 3-5.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of performing inspection alignment point selection for semiconductor devices, the method comprising:

importing, with a computer device, one or more semiconductor design files corresponding to an area of a semiconductor die;

aligning a design taken from the one or more semiconductor design files with an image taken from a die of a semiconductor wafer;

selecting an alignment point and recording a portion of the design file corresponding to the alignment point as a master reference image;

obtaining additional images from additional die of the semiconductor wafer;

comparing the additional images to the master reference image to determine a quality score for the master reference image; and selecting a new alignment point and recording a new portion of the design file corresponding to the new alignment point as a new master reference image in the event the quality score for the master reference image is deemed insufficient.

2. The method of claim 1, further comprising, upon obtaining a sufficient quality score for the master reference image, performing inspection of additional semiconductor wafers.

3. The method of claim 1, wherein the alignment point is selected using either the wafer image or the corresponding imported design.

4. The method of claim 1, wherein the image taken from the die of the semiconductor wafer comprises an electron beam (e-beam) image taken from an e-beam imaging tool.

5. A method of performing inspection alignment of semiconductor devices, the method comprising:

aligning, with an inspection tool, an image of a wafer under inspection in a region of an alignment point with a master reference image, wherein the master reference image is predetermined by importing one or more semiconductor design files corresponding to an area of a semiconductor die, aligning a design taken from the one or more semiconductor design files with an image taken from a die of a previously scanned wafer, and selecting an alignment point and recording a portion of the design file corresponding to the alignment point as the master reference image; and finding a best match between the master reference image and the image of the wafer under inspection so as to identify the alignment point on the wafer under inspection;

wherein the predetermining of the master reference image further comprises obtaining additional images from additional die of the previously scanned wafer and comparing the additional images to the master reference image to determine a quality score for the master reference image; and selecting a new alignment point and recording a new portion of the image corresponding to the new alignment point as a new master reference image in the event the quality score for the master reference image is deemed insufficient.

6. The method of claim 5, further comprising applying a filtering algorithm to the master reference image and the image of the wafer under inspection prior to finding the best match.

7. The method of claim 6, wherein the filtering algorithm comprises one or more of a smoothing algorithm and an edge detection algorithm.

8. The method of claim 5, further comprising identifying multiple alignment points on the wafer under inspection and using the multiple alignment points to align the wafer under inspection so as to determine an exact location of die origin for each die on the wafer under inspection.

9. A non-transitory, computer readable medium having instructions stored thereon that, when executed by a computer, implement a method of performing inspection alignment of semiconductor devices, the method comprising:

aligning an image of a wafer under inspection in a region of an alignment point with a master reference image, wherein the master reference image is predetermined by importing one or more semiconductor design files corresponding to an area of a semiconductor die, aligning a design taken from the one or more semiconductor design files with an image taken from a die of a previously scanned wafer, and selecting an alignment point and recording a portion of the design file corresponding to the alignment point as the master reference image; and finding a best match between the master reference image and the image of the wafer under inspection so as to identify the alignment point on the wafer under inspection;

wherein the predetermining of the master reference image further comprises obtaining additional images from additional die of the previously scanned wafer and comparing the additional images to the master reference image to determine a quality score for the master reference image; and selecting a new alignment point and recording a new portion of the image corresponding to the new alignment point as a new master reference image in the event the quality score for the master reference image is deemed insufficient.

10. The computer readable medium of claim 9, wherein the method further comprises applying a filtering algorithm to the master reference image and the image of the wafer under inspection prior to finding the best match.

11. The computer readable medium of claim 10, wherein the filtering algorithm comprises one or more of a smoothing algorithm and an edge detection algorithm.

12. The computer readable medium of claim 9, wherein the method further comprises identifying multiple alignment points on the wafer under inspection and using the multiple alignment points to align the wafer under inspection so as to determine an exact location of die origin for each die on the wafer under inspection.

13. A system for performing inspection alignment of semiconductor devices, comprising:

a computer device in communication with an inspection tool;

the inspection tool configured to align an image of a wafer under inspection in a region of an alignment point with a master reference image, wherein the master reference image is predetermined by importing one or more semiconductor design files corresponding to an area of a semiconductor die, aligning a design taken from the one or more semiconductor design files with an image taken from a die of a previously scanned wafer, and selecting an alignment point and recording a portion of the design file corresponding to the alignment point as a master reference image; and the computer device configured to find a best match between the master reference image and the image of the wafer under inspection so as to identify the alignment point on the wafer under inspection;

wherein the predetermining of the master reference image further comprises obtaining additional images from additional die of the previously scanned wafer and comparing the additional images to the master reference image to determine a quality score for the master reference image; and selecting a new alignment point and recording a new portion of the image corresponding to the new alignment point as a new master reference image in the event the quality score for the master reference image is deemed insufficient.

14. The system of claim 13, wherein the computer device is configured to apply a filtering algorithm to the master reference image and the image of the wafer under inspection prior to finding the best match.

15. The system of claim 14, wherein the filtering algorithm comprises one or more of a smoothing algorithm and an edge detection algorithm.

16. The system of claim 13, wherein the computer device is configured to identify multiple alignment points on the wafer under inspection and use the multiple alignment points to align the wafer under inspection so as to determine an exact location of die origin for each die on the wafer under inspection.

* * * * *